United States Patent
Nishimori et al.

(10) Patent No.: US 9,062,636 B2
(45) Date of Patent: Jun. 23, 2015

(54) DROP-IN TYPE OF EXHAUST GAS RECIRCULATION VALVE, AND SYSTEM FOR ATTACHING SAME

(75) Inventors: Yuya Nishimori, Tokyo (JP); Haruo Watanuki, Tokyo (JP); Sotsuo Miyoshi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 463 days.

(21) Appl. No.: 13/395,686

(22) PCT Filed: Nov. 18, 2009

(86) PCT No.: PCT/JP2009/006197
§ 371 (c)(1),
(2), (4) Date: Mar. 13, 2012

(87) PCT Pub. No.: WO2011/061795
PCT Pub. Date: May 26, 2011

(65) Prior Publication Data
US 2012/0167862 A1    Jul. 5, 2012

(51) Int. Cl.
*F02M 25/07* (2006.01)
*F16K 5/20* (2006.01)

(52) U.S. Cl.
CPC ....... *F02M 25/0795* (2013.01); *F02M 25/0772* (2013.01); *F02M 25/079* (2013.01); *F16K 5/201* (2013.01); *Y02T 10/121* (2013.01); *F02M 25/0778* (2013.01)

(58) Field of Classification Search
USPC .................. 123/41.13, 41.17, 41.21, 568.11, 123/568.12, 568.18, 568.21
See application file for complete search history.

(56) References Cited

U.S. PATENT DOCUMENTS

| | | | | |
|---|---|---|---|---|
| 4,106,449 A | * | 8/1978 | Matsumoto et al. | 123/568.12 |
| 4,134,377 A | * | 1/1979 | Bamsey et al. | 123/568.12 |
| 5,669,364 A | * | 9/1997 | Everingham | 123/568.18 |
| 5,970,960 A | * | 10/1999 | Azuma | 123/568.12 |
| 6,708,675 B2 | * | 3/2004 | Kato et al. | 123/568.12 |
| 6,789,532 B2 | * | 9/2004 | Kato et al. | 123/568.12 |
| 6,976,480 B2 | * | 12/2005 | Miyoshi et al. | 123/568.12 |
| 2001/0032631 A1 | * | 10/2001 | Cook et al. | 123/568.12 |
| 2001/0037800 A1 | | 11/2001 | Watanabe et al. | |
| 2002/0174858 A1 | | 11/2002 | Kato et al. | |
| 2005/0188965 A1 | | 9/2005 | Usui | |

FOREIGN PATENT DOCUMENTS

| | | |
|---|---|---|
| DE | 197 80 998 A1 | 1/1998 |
| DE | 10344218 A1 | 4/2005 |
| EP | 0 687 842 A2 | 12/1995 |

(Continued)

*Primary Examiner* — John Kwon
*Assistant Examiner* — Johnny H Hoang
(74) *Attorney, Agent, or Firm* — Birch, Stewart, Kolasch & Birch, LLP (57) ABSTRACT

An attaching system of an exhaust gas recirculation valve includes: an attachment unit 2 to be communicated with an exhaust gas circulation passage of an internal combustion engine; and an exhaust gas recirculation valve 1 that is fitted to the attachment unit and that has an exhaust gas passage to be communicated with the exhaust gas circulation passage, wherein the exhaust gas recirculation valve has a water-cooled passage 12 to be communicated with a water-cooled passage 15 for cooling the exhaust gas passage provided with the attachment unit, when fitted to the attachment unit.

7 Claims, 8 Drawing Sheets

(56) References Cited

FOREIGN PATENT DOCUMENTS

| EP | 0 985 619 A2 | 3/2000 |
| EP | 1010887 A1 | 6/2000 |
| EP | 1 355 057 A2 | 10/2003 |
| JP | 6-34160 U | 5/1994 |
| JP | 2001-73883 A | 3/2001 |
| JP | 2002349360 A | 12/2002 |
| JP | 2003-278609 A | 10/2003 |
| JP | 2004-257322 A | 9/2004 |
| JP | 2005-220747 A | 8/2005 |
| JP | 2005-325766 A | 11/2005 |
| JP | 2009250174 A | 10/2009 |
| WO | WO 99/57428 A1 | 11/1999 |
| WO | WO 2009/141945 A1 | 11/2009 |

* cited by examiner

DROP-IN TYPE OF EXHAUST GAS RECIRCULATION VALVE, AND SYSTEM FOR ATTACHING SAME

TECHNICAL FIELD

The present invention relates to a drop in type of exhaust gas recirculation valve that is fitted to an attachment unit to be communicated with an exhaust gas circulation passage of an internal combustion engine, and that has an exhaust gas passage to be communicated with the exhaust gas circulation passage, and relates to the drop-in type of exhaust gas recirculation valve having a water-cooling circuit for cooling the exhaust gas flowing through the exhaust gas passage, and an attaching system of the valve.

BACKGROUND ART

In a drop-in type of exhaust gas recirculation (EGR: Exhaust Gas Recirculation) valve that is fitted to an attachment unit to be communicated with an exhaust gas circulation passage of an internal combustion engine (engine) and that has an exhaust gas passage to be communicated with the exhaust gas circulation passage to control the amount of exhaust gas flowing through the exhaust gas passage, a high-temperature exhaust gas flows in through the exhaust gas passage when part of the exhaust gas exhausted from the engine is recirculated. However, a guaranteed heat resistant temperature is provided for main parts of the EGR valve, and thus, when the high-temperature exhaust gas flows therein, it is required to meet the guaranteed heat resistant temperature.

Figure 7:
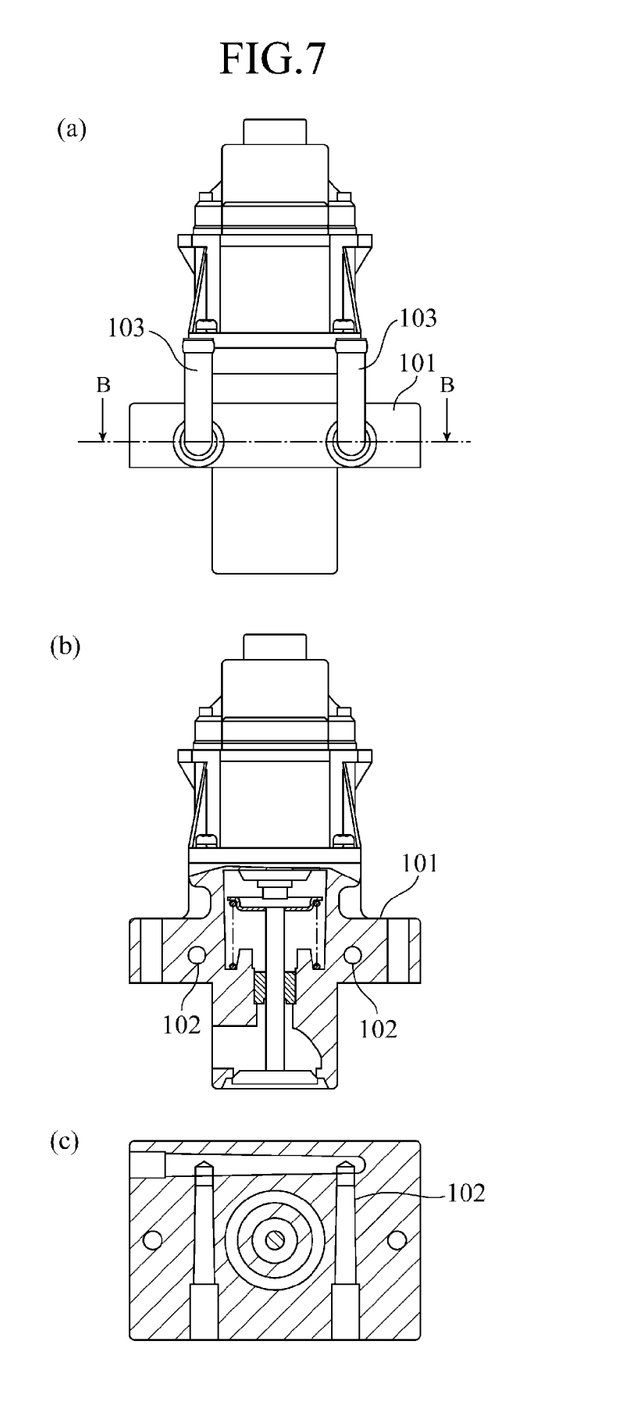
FIG. 7(a) is a front view showing a configuration of a conventional EGR valve.
FIG. 7(b) is a sectional view.
FIG. 7(c) is a sectional view, taken along lines B-B of FIG. 7(a).

Therefore, in order to protect the main parts of the EGR valve from heat, as shown in FIG. 7, a water-cooled circuit 102 is formed around a housing 101 in a conventional EGR valve. As shown in FIGS. 7(a) and 7(b), a nipple 103 for connecting a cooling water hose (not depicted) that renders the flow in/out of cooling water into the water-cooled circuit 102 is press-fitted into the water-cooled circuit 102 formed in the EGR valve. As shown FIG. 7(c), the water-cooled circuit 102 is formed linearly around the housing 101.

In order to protect the main parts of the EGR valve from heat, it is contemplated to dispose the water-cooled circuit in the vicinity of the main parts. However, in the drop-in type of EGR valve, a drop-in portion of the EGR valve is fitted in an attaching hole of an attachment unit, and thus, it is difficult to dispose the water-cooled circuit in the drop-in portion; therefore, when the main parts are disposed at the drop-in portion, it could not be achieved to produce a sufficient cooling effect on the high-temperature exhaust gas flowing through the exhaust gas passage.

Therefore, there is known an EGR valve in which a water-cooled circuit is formed in an attachment unit to which a drop-in portion of the EGR valve is fitted, as measures for cooling the drop-in portion (for example, see Patent Document 1). In Patent Document 1, it is configured that the water-cooled circuit is established around an attaching hole formed in the attachment unit, and that cooling water is flowed into the water-cooled circuit to thereby produce a cooling effect on even the drop-in portion of the EGR valve fitted to the attachment unit.

PRIOR ART DOCUMENTS

Patent Documents

Patent Document 1: Republication Patent WO99/57428

SUMMARY OF THE INVENTION

Figure 8:
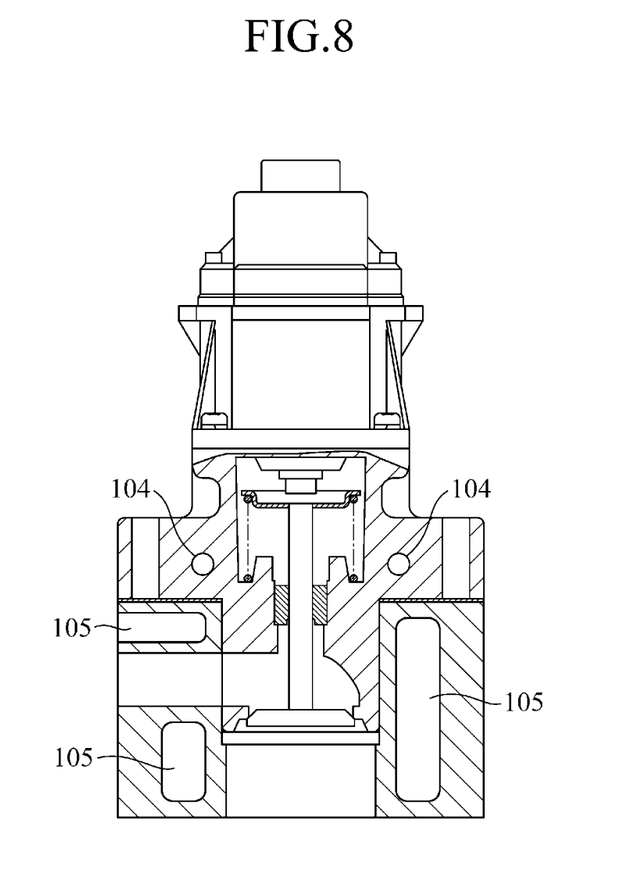
FIG. 8 is a view showing a configuration of an attaching system of a conventional EGR valve.

However, as disclosed in Patent Document 1, for example, under a condition where a high-temperature exhaust gas is merely cooled insufficiently by the attachment unit in which the water-cooled circuit is formed, it is required that as shown in FIG. 8, a water-cooled circuit 104 be formed around a housing, and that an EGR itself be also cooled as in a conventional EGR valve. In such a case, a water-cooled circuit 104 on the side of the EGR valve and a water-cooled circuit 105 on the side of the attachment unit are formed independently from each other; thus, there is a problem such that a cooling effect is low between the water-cooled circuit 104 on the side of the EGR valve and the water-cooled circuit 105 on the side of the attachment unit, which cannot necessarily be said to be effective.

Furthermore, in the EGR valve shown in FIG. 7, it is necessary to press-fit the nipple 103 for connecting the cooling water hose that renders the flow in/out of the cooling water to the water-cooled circuit 102; thus, there is another problem such that the shape of the water-cooled circuit 102 is limited to a linear one, as shown in FIG. 7(c), resulting in a factor interfering with the enhancement of the cooling effect.

The present invention has been made to solve the above-mentioned problems, and an object of the invention is to provide a drop-in type of exhaust gas recirculation valve and an attaching system thereof such that in a drop-in type of EGR valve, a cooling effect in main parts and a drop-in portion of the EGR valve can be further enhanced.

An attaching system of a drop-in type of exhaust gas recirculation valve of the invention includes: an attachment unit to be communicated with an exhaust gas circulation passage of an internal combustion engine; and a drop-in type of exhaust gas recirculation valve that is fitted to the attachment unit in which a drop-in portion is buried, and that has an exhaust gas passage to be communicated with the exhaust gas circulation passage, wherein the drop-in type of exhaust gas recirculation valve has a water-cooled passage to be communicated with water-cooled passage for cooling the exhaust gas passage provided with the attachment unit, when fitted to the attachment unit.

According to the present invention, configured above, when the drop-in type of exhaust gas recirculation valve is fitted to the attachment unit, a water-cooled circuit is formed in such a manner that the water-cooled passage formed on the side of the EGR valve and the water-cooled passage formed on the side of the attachment unit are communicated and integrated with each other, thereby cooling the whole exhaust gas passage; therefore, main parts and a drop-in portion of the EGR valve can be further efficiently cooled. Further, when the water-cooled passage on the side of EGR valve is communicated with the water-cooled passage on the side of the attachment unit, a nipple for connecting a cooling water hose, which is conventionally employed in an EGR valve, becomes unnecessary; thus, greater flexibility in the shape and disposition of the water-cooled passage is provided, and further, the cooling effect can be enhanced. valve becomes unnecessary; thus, greater flexibility in the shape and disposition of the water-cooled passage is achieved, and further, the cooling effect can be enhanced.

BEST MODE FOR CARRYING OUT THE INVENTION

An embodiment of the present invention will next be described in detail by reference to the drawings.

First Embodiment

Figure 1:
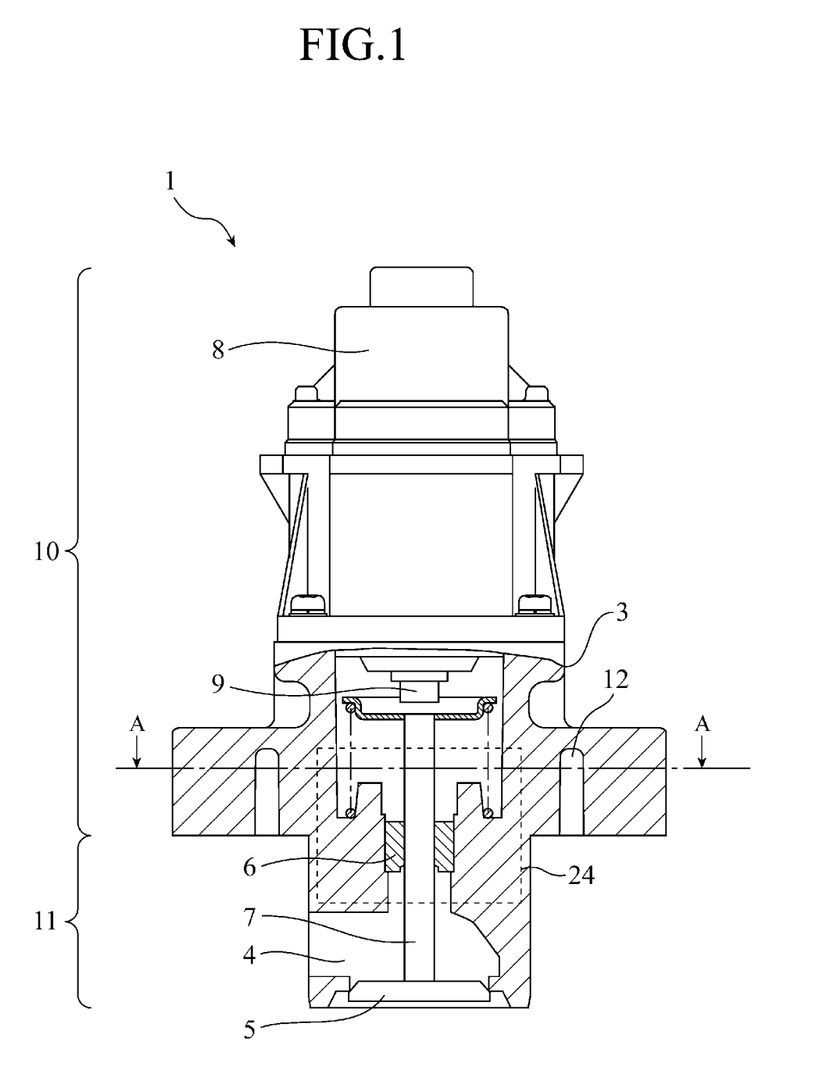
FIG. 1 is a view showing a configuration of an EGR valve of a first embodiment in the present invention.
Figure 2:
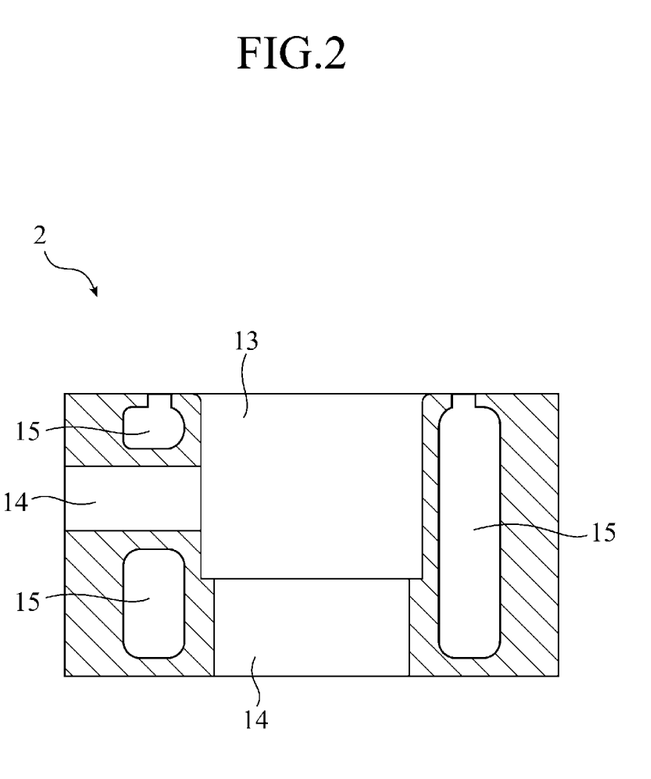
FIG. 2 is a sectional view showing a configuration of an attachment unit of the first embodiment in the invention.
Figure 3:
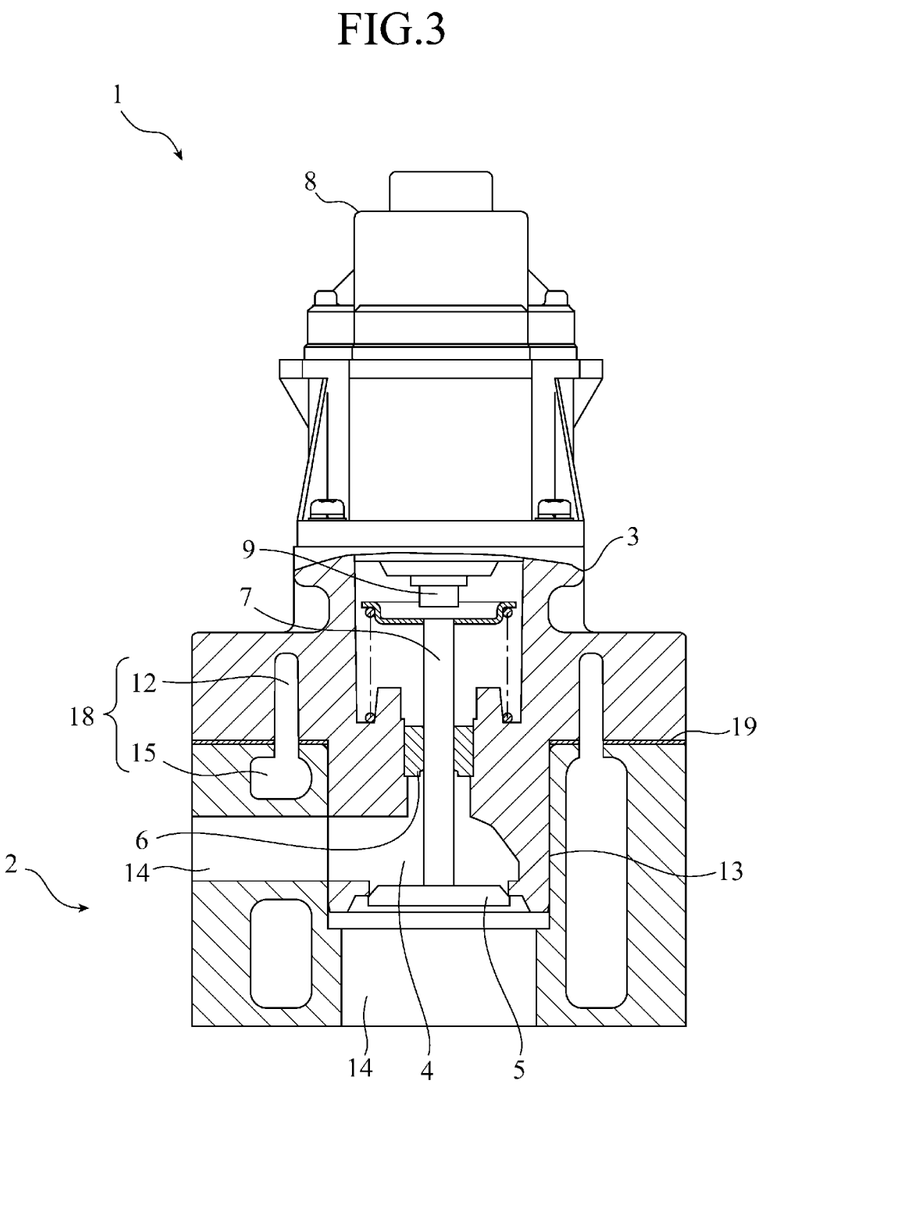
FIG. 3 is a view showing a configuration of an attaching system of an EGR valve of the first embodiment in the invention.

FIG. 1 is a view showing a configuration of an EGR valve 1 of a first embodiment in the invention, and a partly sectional view thereof. FIG. 2 is also a sectional view showing a configuration of an attachment unit 2 of the first embodiment. FIG. 3 is also a view showing a configuration of an attaching system of the EGR 1 valve of the first embodiment, and a partly sectional view thereof.

As shown in FIG. 1 to FIG. 3, the attaching system of the EGR valve 1 is composed of the EGR valve 1 and the attachment unit 2.

In the EGR valve 1, as shown in FIG. 1, an exhaust gas passage 4 through which an exhaust gas flows is formed, and a valve 5 for regulating the amount of the exhaust gas flowing through the exhaust gas passage 4 is arranged with connected to a valve shaft 7 retained by a bushing 6. Further, an actuator 8 connected with an actuator shaft 9 is arranged on the upper portion of the housing 3. When an actuator shaft 9 is operated in a direction of the shaft by the actuator 8, the valve shaft 7 abutting on the actuator shaft 9 is operated in the direction of the shaft to adjust the opening of the valve 5, thereby controlling the amount of exhaust gas flowing through the exhaust gas passage 4.

Hereupon, when the EGR valve 1 is fitted to the attachment unit 2, a protrusive portion 10 is a part not to be buried therein, while when the EGR valve 1 is fitted to the attachment unit 2, a drop-in portion 11 is a part to be buried therein.

In addition, in the protrusive portion 10 of the EGR valve 1, a water-cooled passage 12 having an opening on the abutting surface with the attachment unit 2 is farmed in an annulus ring shape to enclose a bushing area 24 including the bushing 6, and is communicated with a water-cooled passage 15 formed in the attachment unit 2 (discussed later), when the EGR valve 1 is fitted to the attachment unit 2.

On the other hand, in the attachment unit 2, as shown in FIG. 2, an attaching hole 13 to be fitted by the drop-in portion 11 of the EGR valve 1 is formed; when the drop-in portion 11 of the EGR valve 1 is fitted in the attaching hole 13, an exhaust gas passage 14 to be communicated with the exhaust gas passage 4 formed through the EGR valve 1 is established. The exhaust gas passage 14 is communicated with an exhaust gas circulation passage (not shown) of an engine.

Figure 4:
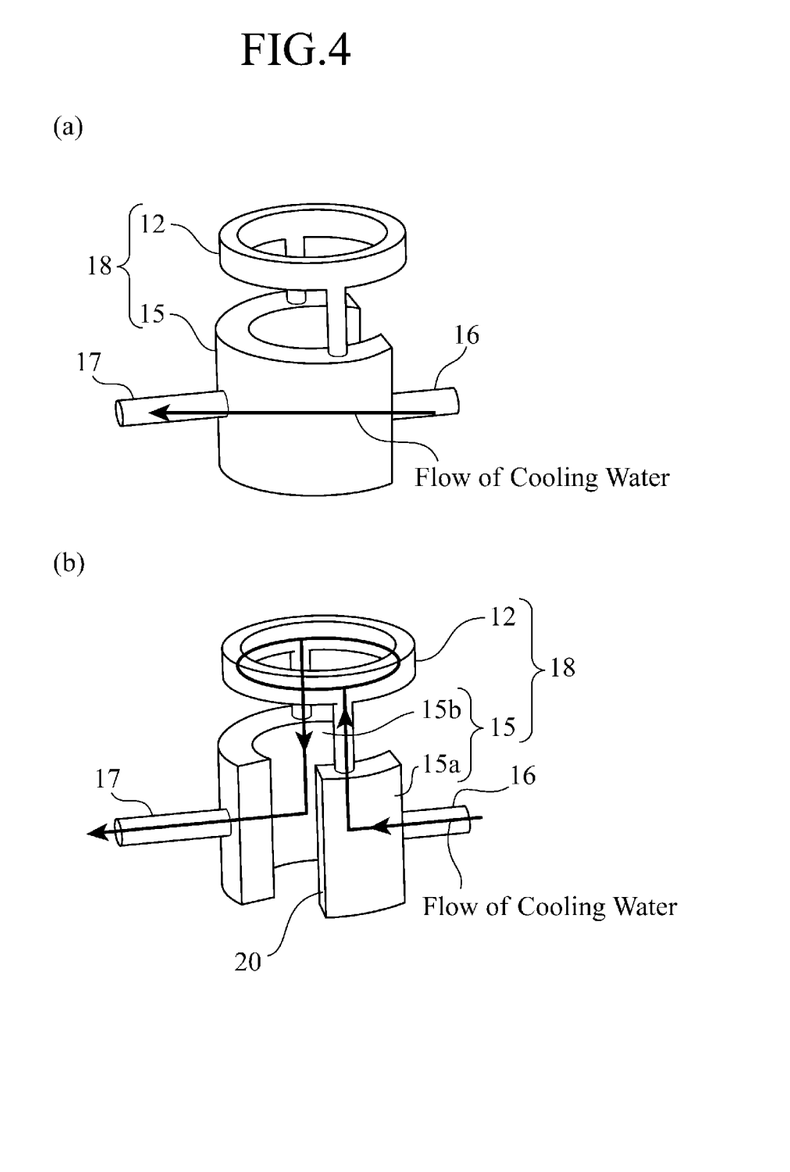
FIG. 4 is a view showing a water-cooled circuit for explaining a blocking section of the first embodiment in the invention.

Further, in the attachment unit 2, a water-cooled passage 15 having an opening on the abutment surface with the EGR valve 1 is formed in an annulus ring shape to enclose the exhaust gas passage 4 of the EGR valve 1 fitted in the attaching hole 13, and is communicated with the water-cooled passage 12 formed in the EGR valve 1, when the EGR valve 1 is fitted therein. Note that in the water-cooled passage 15, as shown in FIG. 4, an inlet port 16 and an outlet port 17 are formed to render the flow-in and flow-out of the cooling water to be flowed inside.

The drop-in portion 11 of the EGR valve 1 configured above is inserted into the attaching hole 13 of the attachment unit 2, which is fastened with screws, thus fitting the EGR valve 1 to the attachment unit 2. In such a way, when an attaching system of the EGR valve 1 is configured, as shown in FIG. 3, the water-cooled passage 12 formed through the EGR valve 1 is communicated with the water-cooled passage 15 formed through the attachment unit 2, so that an integrated water-cooled circuit 18 is established. In addition, it is configured that a seal member 19 such as a gasket is disposed between the abutment surfaces of the EGR valve 1 and the attachment unit 2 to keep the air-tightness and prevent the leakage of the cooled water.

Hereupon, the water-cooled passage 15 of the attachment unit 2 is formed in an annulus ring shape as shown in FIG. 4(a). In this case, the cooling water flowed in from the inlet port 16 passes through the water-cooled passage 15 on the side of the attachment unit 2 as shown by an arrow, and then can flow out from the outlet port 17 without flowing through the water-cooled passage 12 on the side of the EGR valve 1.

Therefore, as shown in FIG. 4(b), a blocking section 20 for dividing the water-cooled passage 15 into a water-cooled passage 15a on the side of the inlet port 16 and a water-cooled passages 15b on the side of the outlet port 17 is formed in the water-cooled passage 15 of the attachment unit 2. The formation of the blocking section 20 can cause the cooling water flowed in from the inlet port 16 to flow through the water-cooled passage 15a on the side of the attachment unit 2, then flow through the water-cooled passage 12 on the side of the EGR valve 1, flow through the water-cooled passage 15b on the side of the attachment unit 2, and subsequently flow out from the outlet port 17.

Figure 5:
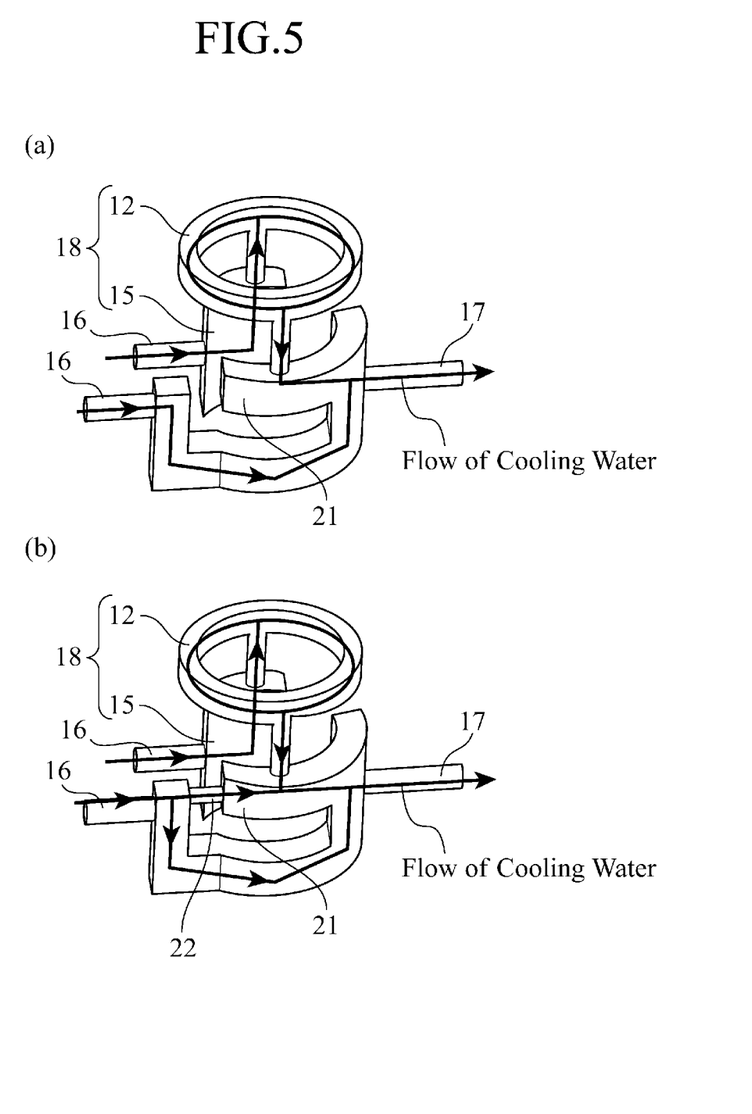
FIG. 5 is a view showing a water-cooled circuit for explaining an additional water passage of the first embodiment in the invention.

However, as shown in FIG. 5(a), when there exists a stagnation portion 21 as a part in which the flow of the cooling water is small in the water-cooled circuit 18 (the water-cooled passages 12, 15), the cooling effect can be reduced in the stagnation portion 21. In such a case, as shown FIG. 5(b), an additional water passage 22 is formed at the stagnation portion 21 to create the flow of the cooling water. The formation of the additional water passage 22 can create the flow of the cooling water at the stagnation portion 21, thereby increasing the cooling effect. Note that when the additional water passage 22 is added thereto, the shape, disposed position, and so on of the additional water passage 22 are designed not to have an effect on the flow in the main water-cooled circuit 18.

Figure 6:
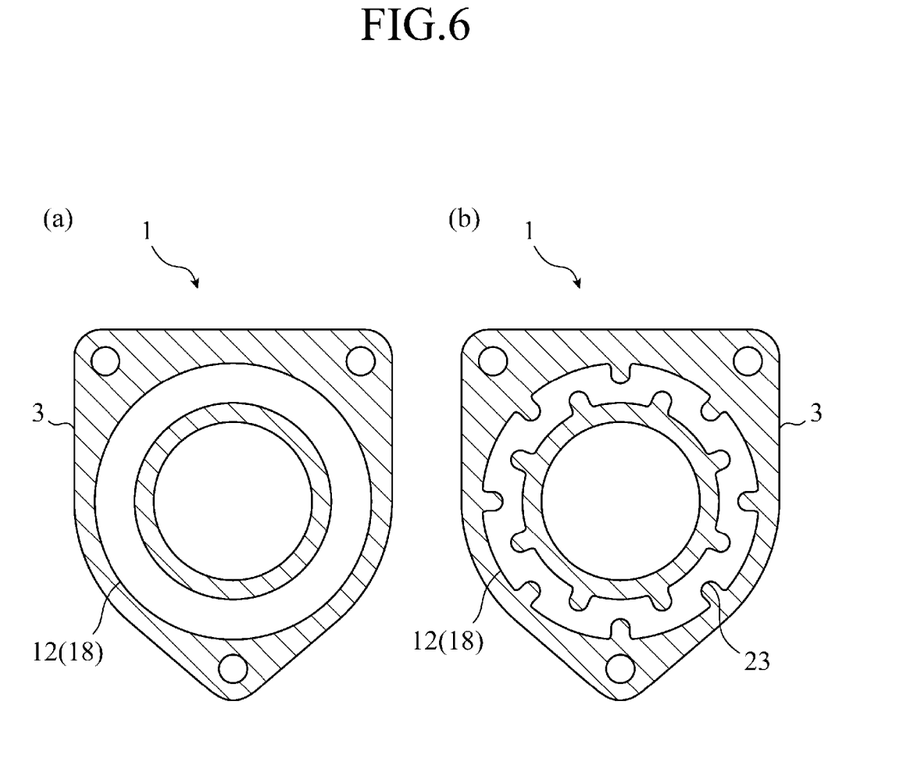
FIG. 6 is a sectional view taken along line A-A of FIG. 1, for explaining a rib of the first embodiment in the invention.

Moreover, though as shown in FIG. 6(a) the water-cooled circuit 18 (water-cooled passages 12, 15) is formed in an annulus ring shape, the water-cooled circuit 18 may be formed with a rib structure 23 having projections and recesses as shown in FIG. 6(b). With such a manner, the contact area of the cooling water flowing through the water-cooled circuit 18 can be increased, further enhancing the cooling effect. Also, it may be arranged that the surface roughness of the water-cooled passage 18 is at least rougher than that of the abutment surface with the attachment unit 2 to increase the contact area with the cooling water, thus enhancing the cooling effect.

As described above, according to the first embodiment in the present invention, it is configured that the water-cooled passages 12, 15 having the openings in the EGR valve 1 and the attachment unit 2, respectively, are formed to enclose the bushing area 24 including the bushing 6 and the exhaust gas passage 4, and that when the EGR valve 1 is fitted to the attachment unit 2, the water-cooled circuit 18 is formed in such a manner that the respective water-cooled passages 12, 15 are communicated and integrated with each other; thus, the bushing area 24 including the bushing 6 of the EGR valve 1 and the whole exhaust gas passage 4 can be cooled, and the main parts and the drop-in portion 11 of the EGR valve 1 can be efficiently cooled.

Also, when the water-cooled circuit 18 is formed in such a manner that the water-cooled passage 12 on the side of the EGR valve 1 is communicated and integrated with the water-cooled passage 15 on the side of the attachment unit 2, a cooling water hose and a nipple for connecting the cooling water hose that are provided in the water-cooled circuit of a conventional EGR valve become unnecessary, thereby reducing the number of the parts and performing a downsizing thereof. Moreover, since the process of an additional work on the water-cooled circuit, and the process of press-fitting a nipple thereinto to be carried out upon the attachment of the nipple can be eliminated, the cost can be reduced, and the fraction defective of the products can be also reduced.

Besides, when the nipples in the EGR valve 1 are not employed, the water-cooled circuit 18 can be formed in a variety of shapes like the annulus ring shape, the rib structure 23, and so on, which is not limited to a straight shape like the water-cooled circuit of the conventional EGR valve, and when there exists the stagnation portion 21 in the water-cooled circuit 18, the additional water passage 22 can be added thereto, further enhancing the cooling effect.

INDUSTRIAL APPLICABILITY

The EGR valve and attaching system thereof the present invention can efficiently cool the main parts and the drop-in portion of the EGR valve, having the exhaust gas passage that is fitted to the attachment unit to be communicated with an exhaust gas circulation passage of an engine to be communicated with the exhaust gas circulation passage, are suitable for use in a drop-in type EGR valve, and an attaching system thereof for controlling the amount of exhaust gas flowing through the exhaust gas passage, and so on.

The invention claimed is:

1. An attaching system of a drop-in type of exhaust gas recirculation valve including:
   an attachment unit to be communicated with an exhaust gas circulation passage of an internal combustion engine, the attachment unit having a first cooling water passage and a recess portion; and
   the drop-in type of exhaust gas recirculation valve that is fitted into the recess portion of the attachment unit, the exhaust gas recirculation valve comprising:
   an actuator;
   a valve to be actuated by the actuator via a valve shaft connecting the valve and the actuator; and
   a housing, connected to the actuator, for housing the valve, the housing including a housing base having a second cooling water passage, and a drop-in portion extending from the housing base in a direction opposite the actuator and having an exhaust gas passage,
   wherein when the drop-in portion is fitted into the recess portion of the attachment unit the first and second cooling water passages communicate with each other in a direction parallel to the valve shaft.

2. The attaching system according to claim 1, wherein a blocking section for passing the cooling water flowed in the first cooling water passage through the second cooling water passage is formed in the first cooling water passage.

3. The attaching system according to claim 1, wherein when there exists a stagnation portion where the flow of cooling water is small, an additional water passage is formed at the stagnation portion to create the flow of the cooling water.

4. A drop-in type of exhaust gas recirculation valve, which is configured to be fitted to an attachment unit having a first cooling water passage and a recess portion, the valve comprising:
   an actuator;
   a valve to be actuated by the actuator via a valve shaft connecting the valve and the actuator; and
   a housing, connected to the actuator, for housing the valve, the housing including a housing base and a drop-in portion extending from the housing base in a direction opposite the actuator and having an exhaust gas passage,
   wherein when the drop-in portion is fitted into the recess portion of the attachment unit, the second cooling water passage communicates with the first cooling water passage in a direction parallel to the valve shaft.

5. The drop-in type of exhaust gas recirculation valve according to claim 4, further including a bushing held by the housing, for supporting the valve shaft, wherein the second cooling water passage is formed to enclose a part of a bushing area including the bushing.

6. The drop-in type of exhaust gas recirculation valve according to claim 4, wherein the second cooling water passage is formed having a rib structure.

7. The drop-in type of exhaust gas recirculation valve according to claim 4, wherein the second cooling water passage is formed to be at least rougher than that of an abutment surface with the attachment unit.

* * * * *